(12) United States Patent
Fugel et al.

(10) Patent No.: US 6,827,498 B2
(45) Date of Patent: Dec. 7, 2004

(54) AXIAL BEARING

(75) Inventors: Wolfgang Fugel, Nürnberg (DE); Alexander Reimchen, Fürth (DE)

(73) Assignee: INA-Schaeffler KG (DE)

( * ) Notice: Subject to any disclaimer, the term of this patent is extended or adjusted under 35 U.S.C. 154(b) by 65 days.

(21) Appl. No.: 10/394,336

(22) Filed: Mar. 20, 2003

(65) Prior Publication Data

US 2003/0179971 A1 Sep. 25, 2003

(30) Foreign Application Priority Data

Mar. 21, 2002 (DE) .......................... 102 12 490

(51) Int. Cl.[7] .............................................. F16C 19/30
(52) U.S. Cl. ..................... 384/620; 384/903; 403/329
(58) Field of Search ................ 384/903, 609, 384/611, 617, 618, 620, 622; 411/516, 517, 521; 403/326, 329

(56) References Cited

U.S. PATENT DOCUMENTS

| 2,503,854 | A | * | 4/1950 | Trainor ........................ 403/326 |
| 3,268,279 | A |   | 8/1966 | Greby |
| 4,608,741 | A | * | 9/1986 | Mallet ......................... 384/617 |
| 4,907,899 | A | * | 3/1990 | Rhoads ........................ 384/620 |
| 5,158,375 | A | * | 10/1992 | Uchida et al. ............... 384/620 |
| 5,199,802 | A | * | 4/1993 | Shinohara et al. .......... 384/617 |
| 5,435,655 | A | * | 7/1995 | Wells .......................... 384/607 |

FOREIGN PATENT DOCUMENTS

| DE | 1870235 | 4/1963 |
| DE | 6750280 | 1/1969 |
| DE | 7138879 | 1/1972 |
| DE | 1525294 | 2/1972 |
| DE | 7035695 | 3/1972 |
| DE | 7206902 | 5/1972 |
| DE | 2600955 | 7/1976 |
| DE | 4409734 | 1/1995 |
| EP | 0153662 | 5/1988 |

OTHER PUBLICATIONS

German Search Report.

* cited by examiner

*Primary Examiner*—Thomas R. Hannon
(74) *Attorney, Agent, or Firm*—Ostrolenk, Faber, Gerb & Soffen, LLP

(57) ABSTRACT

An axial bearing comprising two runner plates held together by a resilient retaining ring having two angled settings. The retaining ring has holding lugs whose circumcircle can be changed in diameter D1 or D2 by a resilient reversible changeover to selectively hold the runner plates together or release the holding.

Figure 1:
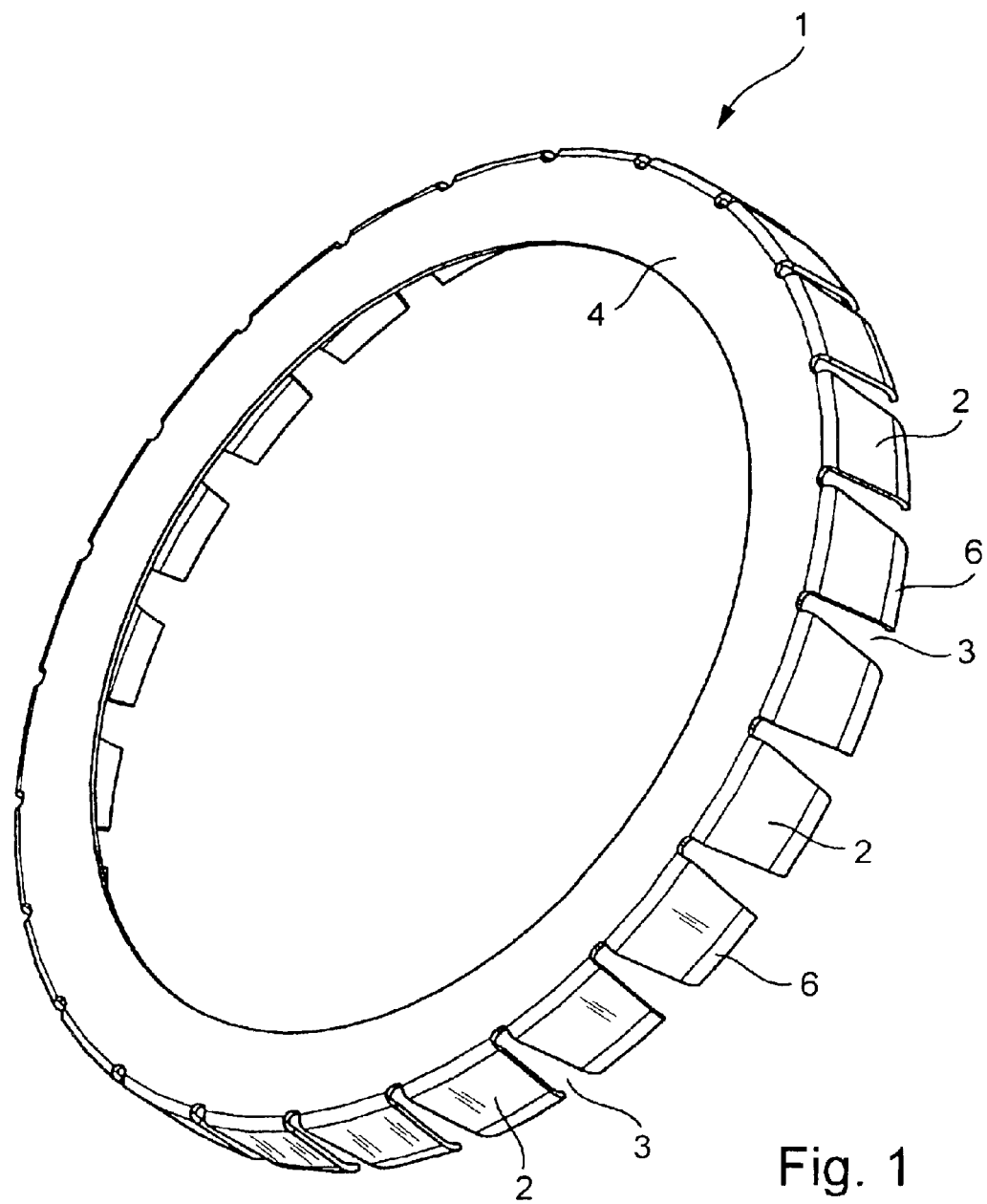

13 Claims, 4 Drawing Sheets

AXIAL BEARING

FIELD OF APPLICATION OF THE INVENTION

The invention relates to an axial bearing comprising two runner plates, between which rolling elements roll on associated raceways. The two runner plates are held together by a sleeve having legs running radially and axially to form a captive structural unit. At least one of the runner plates is encompassed around its circumferential surface by the leg running axially.

BACKGROUND OF THE INVENTION

An axial bearing of such a generic design is known from DE 44 09 734 A1. It comprises two runner plates which are combined by means of a sleeve engaging over their radial circumferential surface to form a bearing unit. The sleeve has a leg which runs axially and engages around both runner plates at their circumferential surfaces. The leg running radially is formed by means of a flanging operation.

It has the disadvantage is that the flanging operation is a complicated additional operation which makes the outlay on production of the entire structural unit more expensive. Added to this is the fact that, in the event of faulty installation, the runner plates also suffer, so that the complete structural bearing unit can no longer be used. Furthermore, the fact that such a bearing has to be destroyed in the event of necessary disassembly has a detrimental effect.

SUMMARY OF THE INVENTION

It is therefore an object of the invention to provide a generic structural axial bearing unit which does not have the disadvantages listed above.

According to the invention, the sleeve is formed as a resilient retaining ring having two settings. The ring is placed above one of the runner plates, here called the upper plate. The sleeve has a plurality of holding tongues which are spaced apart uniformly from one another in the circumferential direction around the ring and which run axially. The tongues have free ends from which holding lugs originate and the lugs are angled over radially and engage behind the other runner plate called the lower plate. A circumcircle of the holding lugs, in their state not connected behind the lower runner plate, have a first diameter D1 greater than the diameter of the runner plates and, in the state of the lugs connected behind the runner plate, the lugs have a second diameter D2 that is smaller than the diameter of the runner plates. The diameter D2 of the circumcircle is set by applying a force to the retaining ring by changing the position of its radial legs, wherein the legs runs with respect to a bearing axis at an angle α of less than 90° at the first diameter D1, and the legs run at an angle of 90° at the second diameter D2 of the circumcircle.

Such an axial bearing unit, comprising a plurality of components, may accordingly be installed quickly and simply. Another substantial advantage is that, when the procedure is reversed, simple and, above all, nondestructive disassembly of the structural bearing unit is also possible.

The holding lugs may engage behind a flat on the lower runner plate. This ensures that the axial bearing structural unit will hold together reliably.

The two runner plates may have the same radial extent and the holding tongues may encompass the runner plates at and around their circumferential surfaces. According to a further feature, one runner plate, such as the lower plate, has an axial ledge on its outer peripheral circumferential surface which encloses the other runner plate at its circumferential surface.

In an additional embodiment, the runner plate away from the ring has an axial ledge on its inner peripheral circumferential surface, which is connected to or is part of an outer ring of a radial bearing. This provides a combined radial-axial structural bearing unit in a simple way.

Other objects and features of the invention are explained using the following exemplary embodiments.

BRIEF DESCRIPTION OF THE DRAWING(S)

Figure 1A:
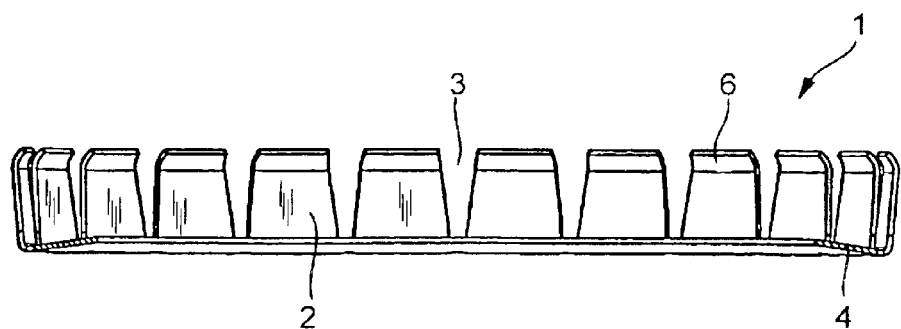
Figure 1B:
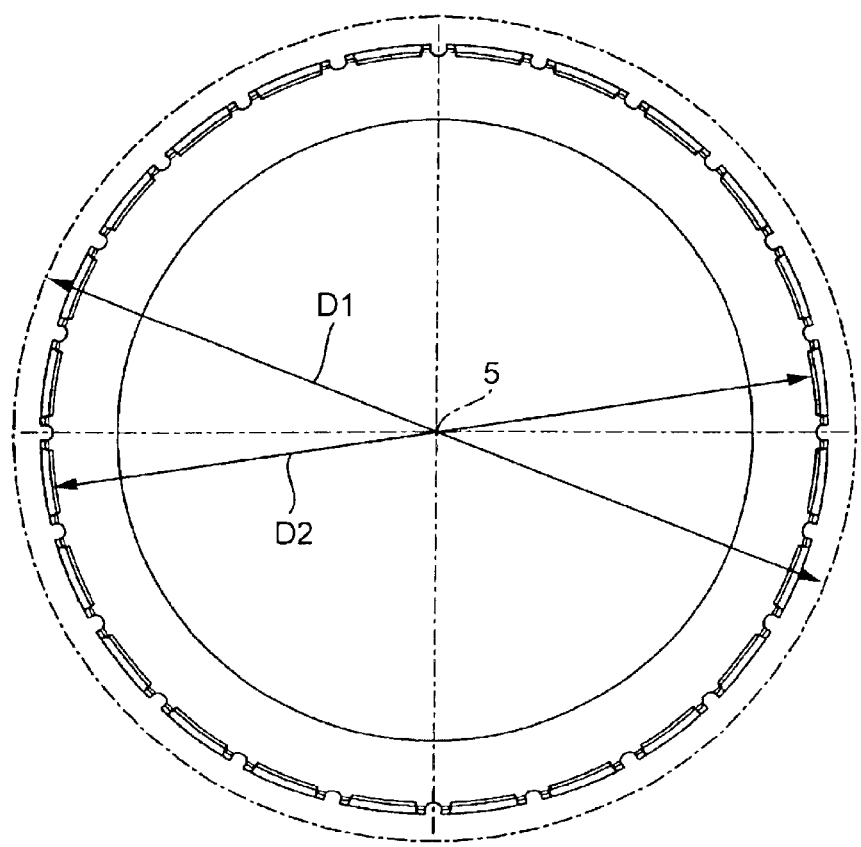
Figure 2:
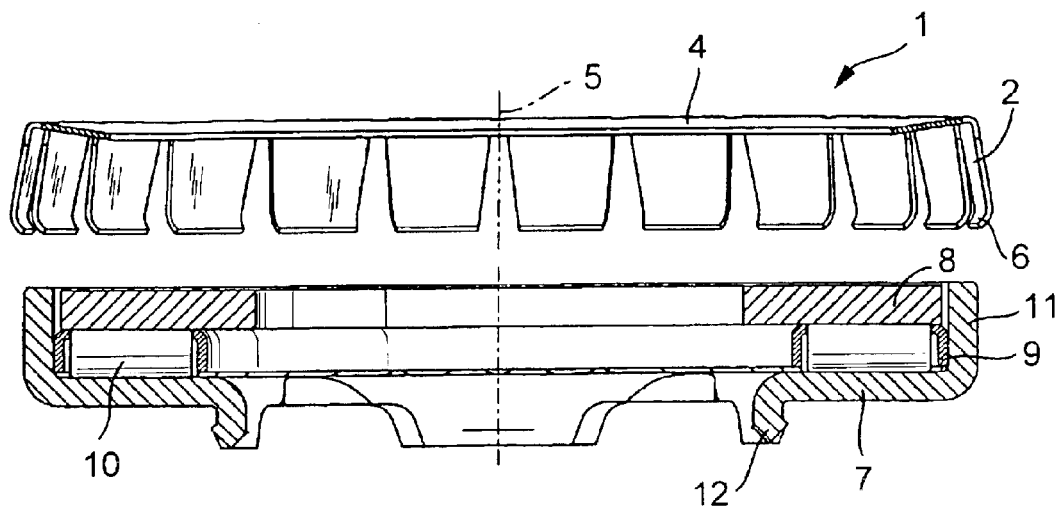
Figure 3:
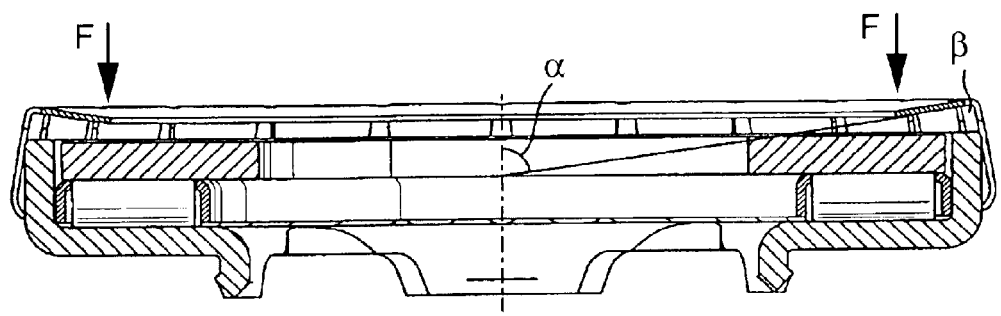
Figure 4:
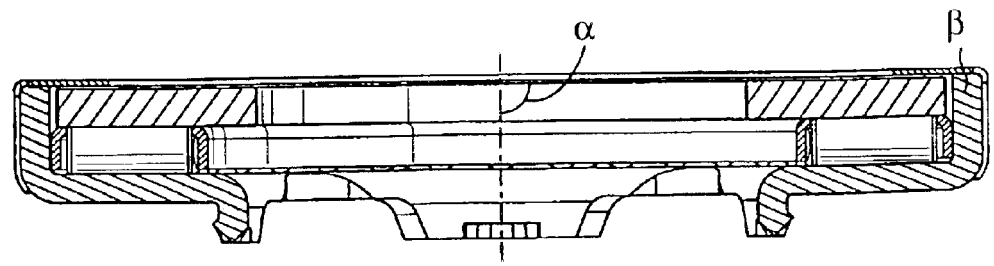
Figure 5:
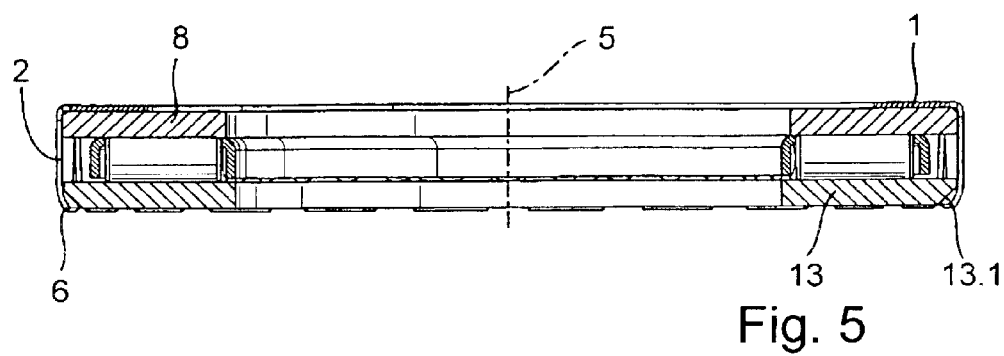
Figure 6:
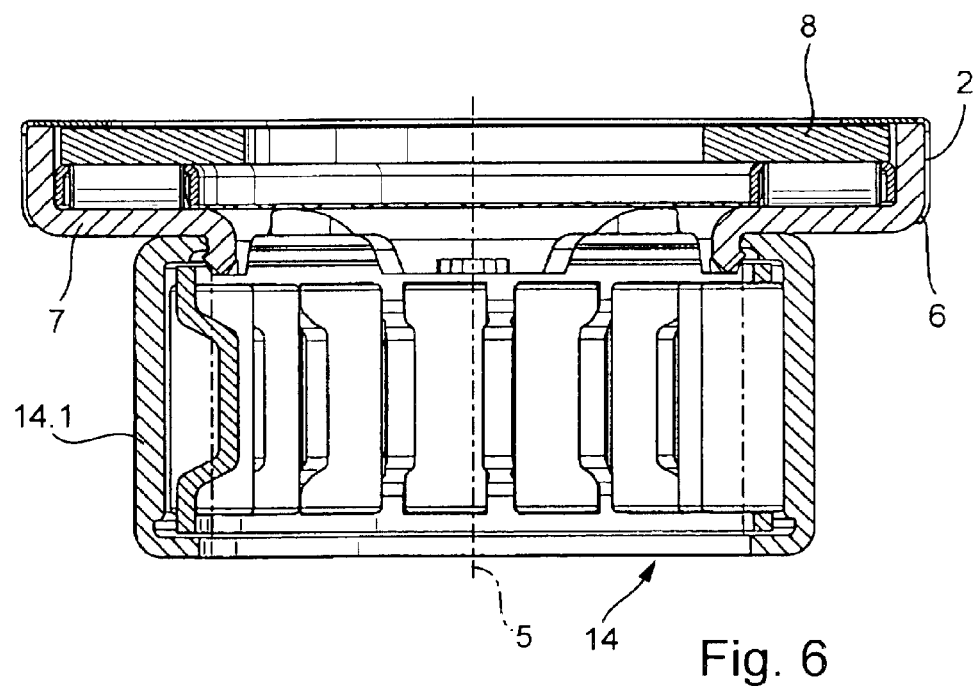

FIG. 1 shows a perspective illustration of a retaining ring according to the invention, FIG. 1a shows a longitudinal section through the retaining ring, FIG. 1b shows a plan view of the retaining ring from below, FIGS. 2, 3 and 4 are illustrations of an axial antifriction bearing according to the invention in various production stages, FIG. 5 shows a further axial bearing according to the invention, and FIG. 6 shows a combined radial-axial antifriction bearing according to the invention.

DETAILED DESCRIPTION OF PREFERRED EMBODIMENTS OF THE INVENTION

The retaining ring 1 shown in FIGS. 1, 1a and 1b has a large number of holding tongues 2 which are spaced apart from one another uniformly in the circumferential direction and are each separated from adjacent tongues by clearances 3. All of the holding tongues 2 originate from a radial leg 4 which is in the form of a circular ring. The tongues 2 extend substantially parallel to the bearing axis 5. At their upper ends, the holding tongues 2 have holding lugs 6 which point radially inward. As shown particularly in FIG. 1b, the resilient retaining ring 1 can have two settings. At the first setting, the holding tongues 2 with their holding lugs 6 form a circumcircle having the diameter D1, while at the second setting, the circumcircle has the diameter D2, wherein D1 is greater than D2. The circumcircle with the larger diameter D1 represents the unconnected state, while the circumcircle with the smaller diameter D2 represents the connected state of the resilient retaining ring 1 with a runner plate.

As FIGS. 2, 3 and 4 show, the resilient retaining ring 1 with the larger circumcircle D1 is first pushed onto an axial bearing, which comprises a lower runner plate 7 and an upper runner plate 8. Between the two plates, rolling elements 10 are guided in a cage 9 to roll on associated raceways on the respective plates. The lower runner plate 7 is provided at its outer peripheral circumferential surface with a ledge 11 which is oriented to extend axially and which encloses the upper runner plate 8 at a radially spaced distance formed by a gap. The inner peripheral circumferential surface of the runner plate 7 has a further axially oriented and extending ledge 12 directed away from the upper plate 8.

As FIGS. 2 and 3 further show, the angle α which describes the angular or tilt orientation of the radial leg 4, which is formed as a circular ring in relation to the bearing axis 5, being less than 90°. This belongs to the circumcircle D1. The radial leg 4 and the holding tongues 2 of the retaining ring 1 continuously form between them an angle β which is approximately a right angle. As seen from FIG. 3, when the retaining ring 1 is pushed onto the axial bearing, then the holding tongues 2 or their holding lugs 6 encompass the lower runner plate 7 at its ledge 11. When the radial leg 4 formed as a circular ring then comes to bear on the upper runner plate 8, the position and orientation of the leg 4 is changed as a result of a force F. This resilient and reversible snapping of the radial leg 4, also referred to as cracking, ensures that the holding tongues 2 with their holding lugs 6 describe the circumcircle D2, having a diameter smaller than the diameter of the lower runner plate 7, and the lower plate is rounded in the lower part. This means that the holding lugs 6 engage behind and below the lower runner plate 7 in its rounded area, and the diameter of that rounded area is slightly smaller than the diameter of the ledge 11. Following the snapping on action, the radial leg 4 is reoriented to extend at a right angle to the bearing axis 5, that is the angle α increases, while the angle β formed by the parts 4 and 2 of the retaining ring 1 remains the same right angle. This produces an axial structural bearing unit assembled from a plurality of parts which can be both installed and removed in a simple way.

In this case, it has proven to be expedient to produce the retaining ring 1 from a resilient spring material.

The axial bearing shown in FIG. 5 is distinguished by the fact that each of the upper runner plate 8 and the lower runner plate 13 is formed as a solid part and both have the same diameter. The lower runner plate 13 has a flat 13.1, behind which the holding lugs 6 of the holding tongues 2 engage, so that a captive structural unit is formed.

Finally, FIG. 6 shows a combined radial-axial bearing, in which the ledge 12 of the lower runner plate 7 of the axial bearing is connected to an outer ring 14.1 of a radial bearing 14, the inner ring and rolling elements of which are not visible, but are present.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An axial bearing comprising:
   a first and a second runner plate over one another and having respective opposed raceways and each having a respective periphery;
   rolling elements between the runner plate raceways for rolling on the raceways;
   a sleeve for holding the runner plates together, the sleeve comprising
   a ring at the circumference of the runner plates; and
   a plurality of holding tongues radially around the ring, the holding tongues extending axially from the ring to pass the runner plates;
   each of the tongues having an end away from the ring and a respective holding lug at each tongue end, wherein the holding lug is angled radially inwardly of the ring and with respect to the respective tongue for engaging behind one of the runner plates;
   the tongues being adjustable in orientation so that in a first state, a circumcircle of the holding lugs in the first state has a first diameter greater than the diameter of the peripheries of the runner plates, and in a second state of the tongues, a circumcircle of the holding lugs has a second diameter which is less than the diameter of the peripheries of the running plates for enabling the lugs to engage behind the one runner plate, wherein the first and second circumcircle diameters of the lugs are obtainable by changing the orientation of the ring with respect to an axis through the bearing and the runner plates.

2. The axial bearing of claim 1, wherein the ring of the sleeve has a radial portion at a selected angle with respect to the bearing axis such that the radial portion of the ring forms an angle α with respect to the bearing axis of less than 90 degrees at the first circumcircle of the first diameter of the lugs and forms an angle α of 90 degrees at the second circumcircle of the second diameter of the lugs.

3. The axial bearing of claim 2, wherein the ring of the sleeve is disposed over the second of the runner plates such that the lugs extend behind the first of the runner plates.

4. The axial bearing of claim 3, wherein the tongues are spaced apart uniformly around the circumference of the ring.

5. The axial bearing of claim 1, wherein the sleeve retaining ring is resilient.

6. The axial bearing of claim 1, wherein the first runner plate has a flat which generally faces away from the second runner plate, and the holding lugs engage behind the flat on the first runner plate.

7. The axial bearing of claim 1, wherein the first and second runner plates have circumferential surfaces and the holding tongues encompass the circumferential surfaces of the runner plates.

8. The axial bearing of claim 7, wherein the first and second runner plates have the same radial extent to their circumferential surfaces.

9. The axial bearing of claim 7, wherein one of the first and second runner plates includes an axial ledge of a size and shape as to enclose the circumferential surface of the other of the first and second runner plates.

10. The axial bearing of claim 9, wherein the first runner plate is annular and has an inner peripheral circumferential surface which defines an axial ledge, an outer ring of a radial bearing connected to the axial ledge on the inner peripheral circumferential surface.

11. The axial bearing of claim 1, wherein one of the first and second runner plates includes an axial ledge of a size and shape as to enclose the circumferential surface of the other of the first and second runner plates.

12. The axial bearing of claim 11, wherein the first runner plate includes the axial ledge.

13. The axial bearing of claim 1, wherein the first runner plate is annular and has an inner peripheral circumferential surface which defines an axial ledge, an outer ring of a radial bearing connected to the axial ledge on the inner peripheral circumferential surface.

* * * * *